June 14, 1960 T. A. WAYMAN 2,941,025
CABLE CONNECTORS FOR METER SOCKETS HAVING HUBS
Filed Nov. 7, 1957
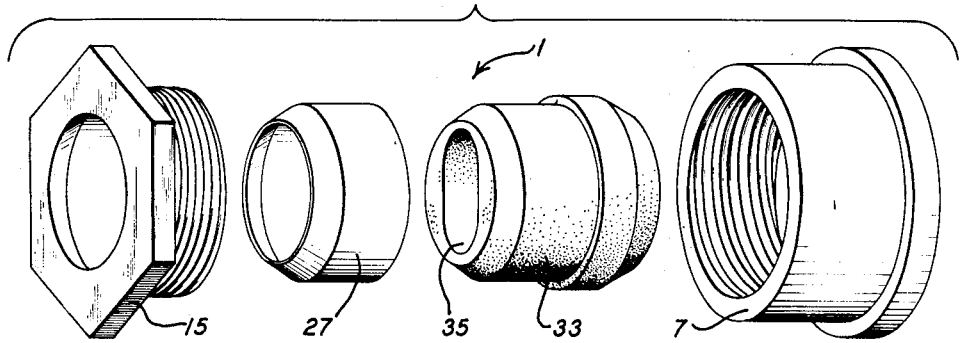
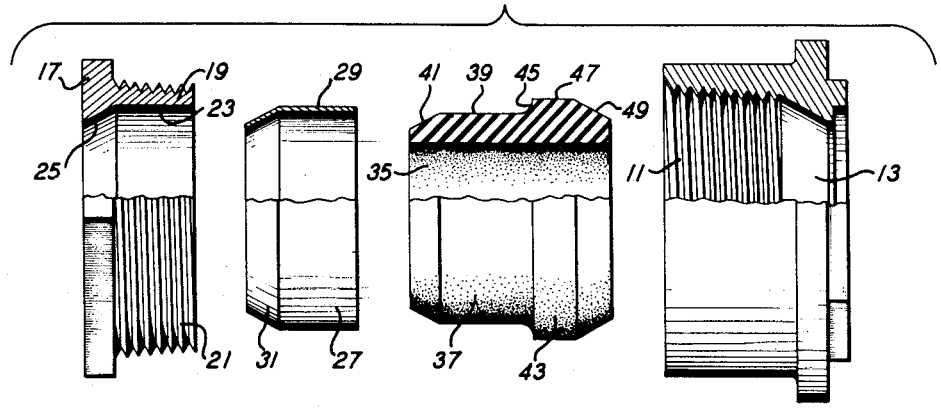
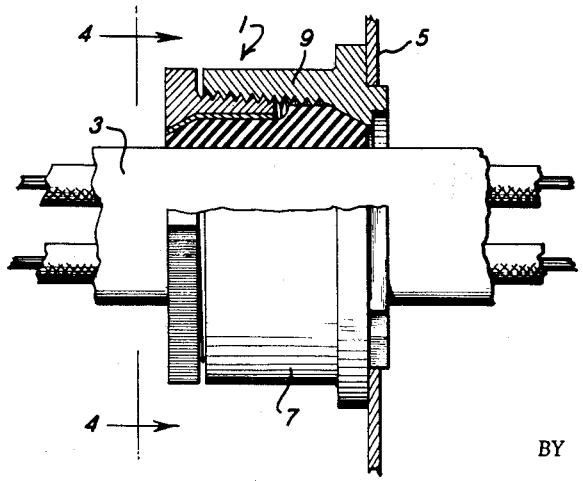
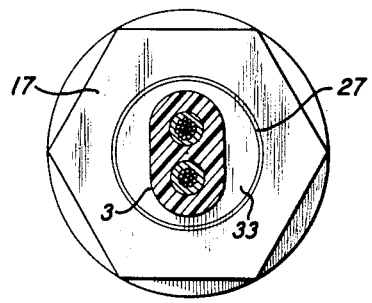
INVENTOR
TED A. WAYMAN
BY Shanley & O'Neil
ATTORNEY

United States Patent Office 2,941,025
Patented June 14, 1960

2,941,025

CABLE CONNECTORS FOR METER SOCKETS HAVING HUBS

Ted A. Wayman, Youngstown, Ohio, assignor to The M. & W. Electric Manufacturing Co., Inc., a corporation of Ohio Filed Nov. 7, 1957, Ser. No. 695,001

6 Claims. (Cl. 174—65)

The present invention relates to cable connectors and more particularly to connectors for making a fluid tight joint between an electric cable and a meter box or other housing in which the cable terminates.

In general, the present invention provides novel cable connectors for use with an internally screw-threaded annular socket, comprising an annular gland receivable in the socket, a thin annular sleeve disposed in the gland, and an elastic deformable bushing disposed in the sleeve. The sleeve has an inner cylindrical portion and an outer tapering portion of generally reduced diameter, and the gland and bushing have complementary internal and external surfaces, respectively. The inner portion of the bushing is enlarged as compared to the outer portion received in the sleeve.

The more specific features and objects of the invention will appear more fully below from the following detailed description considered in conjunction with the accompanying drawing, which discloses a preferred embodiment of the invention. It is to be expressly understood, however, that the drawing is not designed for the purpose of defining the limits of the invention, but is designed for purposes of illustration only, reference for the former purpose being had to the appended claims.

In the drawing, in which similar reference numerals denote similar elements throughout the several views:

Figure 1 is an exploded perspective view of a connector according to the present invention;

Figure 2 is a view similar to Figure 1 but partly in elevation and partly in cross-section;

Figure 3 is an essembly view similar to Figure 2; and

Figure 4 is a cross-sectional view taken on the line 4—4 of Figure 3.

Referring now to the drawings in greater detail, there is shown an electric cable connector indicated generally at 1 for securing and sealing the entrance of an electric cable 3 into a meter box of which a fragment of the side wall is shown at 5. In an opening through side wall 5 is secured a hub or annular socket 7 which extends outwardly from side wall 5 and comprises an outer generally cylindrical female portion 9 provided with internal screw threads 11 which terminate inwardly in a conical internal surface 13 defined by a tapered portion of socket 7 which tapers radially inwardly from screw threads 11 toward the inner end of socket 7.

A nut or annular gland 15 is provided with an outer polygonal head 17 and an inner generally cylindrical male portion 19 having external screw threads 21 thereon engageable in screw-threaded relationship with threads 11 on socket 9, so that by rotation of head 17, gland 15 may be screwed into socket 7, but not to the full depth of threads 11 on socket 7. Gland 15 has an internal cylindrical surface 23 which extends from the inner end of gland 15 toward the outer end thereof. Cylindrical surface 23 terminates at its outer end in an internal truncated conical surface 25 extending from the outer end of cylindrical surface 23 to the outer end of gland 15 and which tapers radially inwardly toward the outer end of gland 15. Cylindrical surface 23 is of substantially greater axial extent than conical surface 25.

A thin annular sleeve 27 has a configuration complementary to that of the internal surfaces of gland 15 and is disposed within gland 15 in contact with those surfaces. Sleeve 27 has, for example, a thickness of about 1/64 inch and is formed of a relatively rigid but workable material, preferably a metal such as aluminum, aluminum alloy, bronze or mild steel. Sleeve 27 has a cylindrical portion 29 of an axial extent at least as great as the axial extent of cylindrical surface 23 on gland 15. Sleeve 27 also has a truncated conical portion 31 of the same taper as truncated conical surface 25 on gland 15. Substantially the entire exterior surface of sleeve 27 is in contact with complementary portions of substantially the entire internal surface of gland 15.

An elastic deformable bushing 33 of a material such as neoprene or other rubber or the like forms the actual seal between cable 3 and the remainder of connector 1. Bushing 33 has an axially extending perforation 35 therethrough of a cross-sectional configuration corresponding to the outer cross-sectional contour of cable 3, which is oval in the illustrated embodiment. The least internal diameter of sleeve 27 is greater than any diameter of perforation 35.

Bushing 33 has an outer annular portion 37 of reduced diameter which is disposed substantially entirely within sleeve 27 and which has an external cylindrical surface 39 complementary to and substantially entirely in contact with cylindrical portion 29 of sleeve 27, and an external truncated conical surface 41 complementary to and entirely in contact with truncated conical portion 31 of sleeve 27. Cylindrical surface 39 of bushing 33 has an axial extent at least as great as the axial extent of cylindrical portion 29 of sleeve 27.

The friction between bushing 33 and sleeve 27 is greater than the friction between gland 15 and sleeve 27 so that relative movement between any of these three elemnts will occur prferentially between the latter pair.

Bushing 33 also has an inner annular portion 43 of enlarged diameter disposed entirely outside sleeve 27 but still entirely within socket 7. Portions 37 and 43 are delineated by an annular shoulder 45 at the inner end of cylindrical surface 39. Shoulder 45 is closely adjacent but spaced inwardly from the inner ends of gland 15 and sleeve 27.

Portion 43 of bushing 33 has an external cylindrical surface 47 of larger diameter than the greatest diameter of sleeve 27 and extending from shoulder 45 inwardly and terminating at its inner end in an external truncated conical surface 49 which tapers radially inwardly from the inner end of cylindrical surface 47 toward the inner end of bushing 33. Cylindrical surface 47 has a diameter substantially the same as the minor or least diameter of screw threads 11 of socket 7 so that portion 43 just touches threads 11. Conical surface 49 of bushing 33 has a taper complementary to that of conical surface 13 of socket 7 and these two conical surfaces are substantially entirely in contact with each other.

In practice, socket 7 will ordinarily have previously been installed on side wall 5 of a meter box or the like, so that the prepared end of cable 3 with gland 15, sleeve 27 and bushing 33 thereon will be introduced into the socket and gland 15 screwed into the socket until the parts assume the position shown in Figure 3. In this position, the tightening of gland 15 in socket 7 exerts an axially inward component of force on bushing 33 which is opposed by an axially outward component of force exerted by conical surface 13 of socket 7, with the result that the elastic deformable material of bushing 33 is displaced in the only direction it can go, that is, radially outward in the region of cylindrical surface 47, so that the inner screw threads 11 on socket 7 in effect bite into and deform but do not cut cylindrical surface 47, thereby improving the seal between bushing 33 and socket 7. Thus, screw threads 11 perform the double function of improving the seal and at the same time providing for engagement with gland 15.

It should also be noted that sleeve 27 prevents contact between any portion of gland 15 and bushing 33, so that gland 15 in effect turns between a pair of spaced apart metallic annular surfaces, the only relative rotation in the entire connector thus being accommodated by metal-to-metal contact. Moreover, the differential coefficients of friction by which the friction between sleeve 27 and bushing 33 is greater than the friction between sleeve 27 and gland 15, assure that all rotation relative to sleeve 27 will be by gland 15 rather than bushing 33, so that bushing 33 does not bind or gall but rather is subjected only to axially compressive movement.

Although the present invention has been described in connection with preferred embodiments, it is to be understood that modifications and variations may be resorted to without departing from the spirit or scope of the invention, as those skilled in this art will readily understand. Such modifications and variations are considered to be within the purview and scope of the invention as defined by the appended claims.

What is claimed is:

1. A cable connector for use with an internally screw-threaded annular socket, comprising an annular gland having an externally screw-threaded inner end adapted for screw-threaded reception in an internally screw-threaded annular socket, the gland having an internal cylindrical surface terminating outwardly in an internal surface which tapers radially inwardly toward the outer end of the gland, a thin annular sleeve disposed within the gland and having cylindrical and tapered portions complementary to and in contact with said cylindrical and tapered internal surfaces respectively of the gland, and an axially perforate elastic deformable bushing of a material more readily deformable than the material of the sleeve, the bushing being disposed within the sleeve and gland and having cylindrical and tapered external surfaces complementary to and in contact with cylindrical and tapered portions respectively of the sleeve, the sleeve having a least internal diameter greater than any internal diameter of the bushing, the friction between the bushing and the sleeve being greater than the friction between the gland and the sleeve.

2. A cable connector for use with an internally screw-threaded annular socket, comprising an annular gland having an externally screw-threaded inner end adapted for screw-threaded reception in an internally screw-threaded annular socket, the gland having an internal cylindrical surface terminating outwardly in an internal surface which tapers radially toward the outer end of the gland, a thin annular sleeve disposed within the gland and having cylindrical and tapered portions complementary to and in contact with said cylindrical and tapered internal surfaces respectively of the gland, said cylindrical portion of the sleeve having an axial extent at least as great as the axial extent of said cylindrical internal surface of the gland, and an axially perforate elastic deformable bushing of a material more readily deformable than the material of the sleeve, the bushing being disposed within the sleeve and gland and having cylindrical and tapered external surfaces complementary to and in contact with the cylindrical and tapered portions respectively of the sleeve, said cylindrical external surface of the bushing having an axial extent at least as great as the axial extent of said cylindrical portion of the sleeve, the sleeve having a least internal diameter greater than any internal diameter of the bushing, the friction between the bushing and the sleeve being greater than the friction between the gland and the sleeve.

3. A cable connector for use with an internally screw-threaded annular socket, comprising an annular gland having an externally screw-threaded inner end adapted for screw-threaded reception in an internally screw-threaded annular socket, the gland having an internal cylindrical surface terminating outwardly in an internal surface which tapers radially inwardly toward the outer end of the gland, a thin annular sleeve disposed within the gland and having cylindrical and tapered portions complementary to and in contact with said cylindrical and tapered internal surfaces respectively of the gland, and an axially perforate elastic deformable bushing of a material more readily deformable than the material of the sleeve, the bushing having an outer annular portion disposed within the sleeve and gland and having cylindrical and tapered external surfaces complementary to and in contact with the cylindrical and tapered portions respectively of the sleeve, the bushing having an inner annular portion of substantially greater outside diameter than the greatest diameter of the sleeve adapted for engagement with internal surfaces of said socket inwardly of the gland, the sleeve having a least internal diameter greater than any terminal diameter of the bushing, the friction between the bushing and the sleeve being greater than the friction between the gland and the sleeve.

4. A cable connector for use with an internally screw-threaded annular socket, comprising an annular gland having an externally screw-threaded inner end adapted for screw-threaded reception in an internally screw-threaded annular socket, the gland having an internal cylindrical surface terminating outwardly in an internal surface which tapers radially inwardly toward the outer end of the gland, a thin annular sleeve disposed within the gland and having cylindrical and tapered portions complementary to and in contact with said cylindrical and tapered internal surfaces respectively of the gland, said cylindrical portion of the sleeve having an axial extent at least as great as the axial extent of said cylindrical internal surface of the gland, and an axially perforate elastic deformable bushing of a material more readily deformable than the material of the sleeve, the bushing having an outer annular portion disposed within the sleeve and gland and having cylindrical and tapered external surfaces complementary to and in contact with the cylindrical and tapered portions respectively of the sleeve, the bushing having an inner annular portion of substantially greater outside diameter than the greatest diameter of the sleeve adapted for engagement with internal surfaces of said socket inwardly of the gland, said cylindrical external surface of the bushing having an axial extent at least as great as the axial extent of said cylindrical portion of the sleeve, the sleeve having a least internal diameter greater than any internal diameter of the bushing, the friction between the bushing and the sleeve being greater than the friction between the gland and the sleeve.

5. A cable connector as claimed in claim 3, said inner annular portion of the bushing terminating outwardly in an annular shoulder which is spaced inwardly from the inner end of the gland.

6. A cable connector as claimed in claim 4, said inner annular portion of the bushing terminating outwardly in an annular shoulder which is spaced inwardly from the inner end of the gland.

References Cited in the file of this patent

UNITED STATES PATENTS

| | | |
|---|---|---|
| 2,021,745 | Pfefferle et al. | Nov. 19, 1935 |
| 2,564,302 | Fraser | Aug. 14, 1951 |
| 2,788,992 | De Vienne et al. | Apr. 16, 1957 |
| 2,816,949 | Curtiss | Dec. 17, 1957 |

FOREIGN PATENTS

| | | |
|---|---|---|
| 839,587 | France | Jan. 4, 1939 |

UNITED STATES PATENT OFFICE

CERTIFICATE OF CORRECTION

Patent No. 2,941,025

June 14, 1960

Ted A. Wayman

It is hereby certified that error appears in the printed specification of the above numbered patent requiring correction and that the said Letters Patent should read as corrected below.

Column 3, line 57, after "radially" insert -- inwardly --.

Signed and sealed this 6th day of December 1960.

(SEAL)
Attest:

KARL H. AXLINE
Attesting Officer

ROBERT C. WATSON
Commissioner of Patents